United States Patent
Piehlk

(10) Patent No.: US 11,433,443 B2
(45) Date of Patent: Sep. 6, 2022

(54) MOVABLE HEAT-INSULATING CARRIAGE IN METAL PROCESSING

(71) Applicant: SMS GROUP GMBH, Düsseldorf (DE)

(72) Inventor: Andreas Piehlk, Siegen (DE)

(73) Assignee: SMS GROUP GMBH, Düsseldorf (DE)

(*) Notice: Subject to any disclaimer, the term of this patent is extended or adjusted under 35 U.S.C. 154(b) by 0 days.

(21) Appl. No.: 16/333,351

(22) PCT Filed: Sep. 11, 2017

(86) PCT No.: PCT/EP2017/072675
§ 371 (c)(1),
(2) Date: Mar. 14, 2019

(87) PCT Pub. No.: WO2018/050574
PCT Pub. Date: Mar. 22, 2018

(65) Prior Publication Data
US 2019/0210081 A1 Jul. 11, 2019

(30) Foreign Application Priority Data
Sep. 16, 2016 (DE) ............ 10 2016 217 720.6

(51) Int. Cl.
*B21B 45/00* (2006.01)
(52) U.S. Cl.
CPC .......... *B21B 45/008* (2013.01); *B21B 45/004* (2013.01); *B21B 2203/12* (2013.01); *Y02P 70/10* (2015.11)

(58) Field of Classification Search
CPC . B21B 45/008; B21B 45/004; B21B 2203/12; F27D 2001/1841; C21D 9/56
See application file for complete search history.

(56) References Cited

U.S. PATENT DOCUMENTS 2,078,005 A * 4/1937 Lloyd ............ B21B 1/06
72/168
3,344,648 A 10/1967 Gray
(Continued)

FOREIGN PATENT DOCUMENTS

CN  2803549 Y  8/2006
DE  1452102 A1  12/1968
(Continued)

OTHER PUBLICATIONS

English translation of Korean Action dated Jun. 17, 2020, 10 pages.

*Primary Examiner* — Scott R Kastler
(74) *Attorney, Agent, or Firm* — Lucas & Mercanti, LLP; Klaus P. Stoffel

(57) ABSTRACT

A heat-insulating device for use in a processing line for a metal strip to be transported along a strip conveying direction, preferably for use in a rolling mill, wherein the heat-insulating device has: at least one heat-insulating carriage which has a heat-insulating hood which, in order to reduce temperature losses, can be moved over the metal strip; and a transport, which has a drive for moving the heat-insulating carriage and is configured in such a way that the heat-insulating carriage can be moved out of the processing line and into the latter horizontally, preferably along a straight line.

15 Claims, 3 Drawing Sheets

(56) References Cited

U.S. PATENT DOCUMENTS

| | | | |
|---|---|---|---|
| 4,343,168 A | | 8/1982 | Laws et al. |
| 4,420,029 A | * | 12/1983 | Kameyama ........ B22D 11/1213 |
| | | | 164/448 |
| 4,554,812 A | * | 11/1985 | Hirschmanner ...... B21B 45/008 |
| | | | 72/202 |
| 4,803,864 A | | 2/1989 | Brysbaert |
| 5,711,175 A | | 1/1998 | Laws |
| 6,018,855 A | | 2/2000 | Drigani |
| 10,265,744 B2 | | 4/2019 | Chung |

FOREIGN PATENT DOCUMENTS

| | | |
|---|---|---|
| DE | 69407253 T2 | 6/1998 |
| DE | 69503168 T2 | 12/1998 |
| EP | 0141798 A2 | 5/1985 |
| JP | S5374448 A | 6/1978 |
| JP | H0225212 A | 1/1990 |
| JP | H11172325 A | 6/1999 |
| KR | 101435056 B1 | 8/2014 |
| WO | 2014048629 A1 | 4/2014 |
| WO | 2015099224 A1 | 7/2015 |

* cited by examiner

MOVABLE HEAT-INSULATING CARRIAGE IN METAL PROCESSING

CROSS-REFERENCE TO RELATED APPLICATIONS

The present application is a 371 of International application PCT/EP2017/072675, filed Sep. 11, 2017, which claims priority of DE 10 2016 217 720.6, filed Sep. 16, 2016, the priority of these applications is hereby claimed and these applications are incorporated herein by reference.

TECHNICAL FIELD

The invention relates to a heat-insulating installation for use in a processing line for a metal strip to be transported along a strip-conveying direction, preferably for use in a rolling mill, wherein the heat-insulating installation has a heat-insulating hood.

BACKGROUND TO THE INVENTION

In the processing of metal, in particular in togging trains and finishing trains in the hot-rolling mill, stationary or adjustable heat-insulating hoods are used so as to minimize temperature losses during the transport of the metal strip. For example, DE 1 452 102 A1 describes a method and a device for controlling the temperature profile of a hot strip in the rolling procedure, To this end, temperature measuring installations and movable reflector units which are movable to a shielding position above the hot strip as a function of the measured temperature, are provided. Further systems for hot rolling strip-shaped roiled material having a heat-insulating cover are described in EP 0 141 798 A2 and US 4,343,168 A.

In the conventional heat-insulating hoods it is disadvantageous that said heat-insulating hoods, despite or specifically because of any potential mobility which is often embodied as a pivoting movement, block installation space in the production line. Said heat-insulating hoods compromise the view onto the rolling operation and impede the maintenance or the removal of disruptions, since the respective regions of the system are difficult to access on account of the heat-insulating hoods. The blocked space is furthermore not utilizable for other installations.

SUMMARY OF THE INVENTION

An object of the invention is to specify a heat-insulating installation for use in a processing line for a metal strip to be transported along a conveying direction, preferably for use in a rolling mill, which overcomes at least one of the technical disadvantages mentioned above. The reliability and flexibility of the system for processing the metal strip is in particular to be improved.

The heat-insulating installation according to the invention is provided for use in a processing line, also referred to as a production line, for a metal strip to be transported along a strip-conveying direction, preferably for use in a rolling mill. Said heat-insulating installation according to the invention is preferably capable of being used in cogging trains and finishing trains in hot-rolling mills with a continuous rolling operation and/or a semi-continuous operation and/or a batch rolling operation. The heat-insulating installation has a heat-insulating carriage which has a heat-insulating hood which for minimizing temperature losses is movable over, or more generally to, the metal strip. The heat-insulating hood can be constructed and extendable in a modular manner, for example in that a plurality of heat-insulating elements are provided, the number and/or the construction of said heat-insulating elements being adaptable to different environments, materials, and/or operating conditions. The heat-insulating hood has a heat-insulating structure. For example, materials having a low thermal conductivity and/or a high reflective capability in terms of heat radiation can be used. The heat insulation can however also be guaranteed or facilitated by vacuum heat insulation, geometrical or structural properties of the respective elements. This applies in an analogous manner to optional or preferred heat-insulating elements of the heat-insulating carriage which are described further below.

The heat-insulating installation furthermore has a transporting means which has a drive for relocating the heat-insulating carriage and is specified such that the heat-insulating carriage is capable of being driven out of the processing line horizontally, and capable of being driven into said processing line. The term "horizontal" is to be considered relative to the processing line, that is to say that the heat-insulating carriage is capable of being relocated parallel to the floor or the foundation of the system (for example the rolling mill), or of the transported metal strip. The heat-insulating carriage is preferably capable of being driven out of, and capable of being driven into, the processing line horizontally in relation to the strip-conveying direction and along a straight line. Depending on the construction mode, the drive can be provided underground or overground. The relocation capability of the heat-insulating carriage does not have to be performed strictly horizontally in relation to the strip-conveying direction, and the movement trajectory does not have to be strictly linear; it is important that the heat-insulating carriage can be driven out of the processing line without problems, without said heat-insulating carriage in the driven-out state blocking the processing line. This is in particular guaranteed in the case of a minor installation space when the relocation capability takes place along a line which is parallel to the strip face, that is to say is horizontal.

The heat-insulating hood is thus not pivoted or adjusted in the manner of a lever, but the complete heat insulation in the guise of the heat-insulating carriage can be removed from the processing line, on account of which another installations or another module such as, for instance, an induction heater, can be incorporated in the processing line at the respective location. On account thereof, the system can be set and utilized in a remarkably flexible manner. Furthermore, after the driving out of the heat-insulating carriage, the view onto the processing line and the accessibility are outstanding, on account of which the maintenance can be carried out in a simple manner and any potential disruption can be alleviated in a rapid and reliable manner.

The transporting means preferably has one or a plurality of rails and/or bars and/or rollers, on account of which driving out or pushing out the heating installation from the processing line is implementable in a mechanically simple manner. For this purpose, the drive can be performed, for example, hydraulically and/or electrically and/or pneumatically and/or as a combination thereof.

A roller way having a plurality of rollers for transporting the metal strip is preferably provided along the processing line, wherein the heat-insulating installation can be specified such that the associated heat-insulating carriage is capable of being driven into the intermediate space between two neighboring rollers, and capable of being driven out of said intermediate space. The existing installation space is thus effectively utilized. In particular, the region between rollers is thus readily accessible and/or otherwise utilizable.

The heat-insulating carriage preferably has lateral heat insulations which, conjointly with the heat-insulating hood, configure a profile that in the cross section perpendicular to the strip-conveying direction is U-shaped. Alternatively or additionally, the heat-insulating carriage can have an undercarriage which lies opposite the heat-insulating hood such that said undercarriage in the case of a driven-in heat-insulating carriage is disposed below the metal strip, while the heat-insulating hood is disposed above the metal strip, when viewed along the direction of gravity. The undercarriage for minimizing temperature losses is preferably configured so as to be heat-insulating. The heat-insulating hood, the lateral heat insulations, and the undercarriage can in this way configure walls of a tunnel which surrounds a heat-insulating space and through which the metal strip passes in the driven-in state of the heat-insulating carriage. The heat insulation can be set to the desired requirements by way of the shapes, structures, and/or materials of the tunnel walls (of the completely or partially surrounding tunnel). The term "tunnel" in the present context is used even when the region to be insulated, that is to say the heat-insulating space, is not completely surrounded by insulating elements. For example, the metal strip could be provided in the manner of a sandwich, between an insulation hood and an undercarriage, without lateral insulations being present; this case is also intended to be comprised by the term "tunnel", since the heat-insulating space is at least partially surrounded in the manner of a tunnel by insulating elements. The tunnel walls can in particular be configured so as to be adjustable, for instance so as to be displaceable and/or so as to be opened and closed. According to one embodiment, the tunnel walls configure a closed tunnel, that is to say a tunnel which, with the exception of the entry and exit openings for the metal strip, fully surrounds the latter. In this case, the heat-insulating carriage cannot be driven in and driven out in the rolling operation or generally in the processing operation.

According to one preferred embodiment a lateral slot for driving in and driving out the heat-insulating carriage is provided preferably between a lateral heat insulation and the undercarriage. The metal strip can pass the tunnel or the heat-insulating space, respectively, through said slot when the heat-insulating carriage is driven into the processing line. Conversely, the metal strip when driving out the heat-insulating carriage can likewise pass through the slot, on account of which a problem-free driving-in and driving-out is possible. The driving into the processing process, preferably rolling process, in this case can be performed prior to the process start or during the process. In an analogous manner, the heat-insulating carriage during the process can be driven into a standby position outside the processing line.

Alternatively or additionally to the slot, a portion of the tunnel can be provided such that said portion can be opened and closed. A heat-insulating element can in particular be mounted so as to be movable. The movably mounted heat-insulating element is particularly preferably a lateral heat insulation which is mounted so as to be pivotable. On account thereof, the tunnel or the tunnel opening, respectively, can be enlarged on account of which the operational reliability can be improved, for example during a disruption. The movably mounted module herein is pulled over the metal strip, for example, and thus enlarges the opening to the required dimension so as to be able to pull out the heat-insulating carriage over the metal strip.

The undercarriage preferably has overpass means, particularly preferably overpass ribs and/or overpass rollers, which are capable of being brought into contact with the metal strip in order for the latter to pass over in the driven-in state of the heat-insulating carriage. In this way, the heat-insulating carriage in a synergetic manner is conjointly utilized for guiding the metal strip and/or for reliably transporting the latter, in that said heat-insulating carriage, besides the primary function thereof (minimizing heat loss during the processing) functions as an overpass table.

The heat-insulating carriage preferably has an accessible platform, on account of which the maintenance of not only the heat-insulating installation but also of other regions of the system can be simplified. Alternatively or additionally, the heat-insulating carriage can be relocatable so far that any maintenance of system parts, in particular stationary system parts, is facilitated.

The object of the invention mentioned above, is furthermore achieved by a system for processing a metal strip, preferably a rolling mill, which has a roller way having rollers for transporting the metal strip along a strip-conveying direction, and one or a plurality of the heat-insulating installations described above, the heat-insulating carriages of said heat-insulating installations being capable of being driven into associated intermediate spaces between neighboring rollers of the roller way, and capable of being driven out of said intermediate spaces.

Alternatively or additionally, the heat-insulating installation can be specified such that the associated heat-insulating carriage is capable of being driven in and driven out between roller stands in a rolling mill. A further or alternative application is possible in the region between a tunnel furnace and a roller stand, preferably the first roller stand.

One or a plurality of relocatable induction heaters which is/are capable of being driven into the processing line, preferably into intermediate spaces that are not occupied by heat-insulating carriages, and capable of being driven out of said processing line, is/are preferably provided. In this way, spaces in the processing line can be utilized in a modular manner; said spaces can be cleared for improving the accessibility, for instance, and/or, depending on the operative situation, be equipped with a heat-insulating carriage and/or an induction heater.

A plurality of heat-insulating carriages of one or a plurality of heat-insulating installations are preferably connected or capable of being connected to one another by means of a connection element, wherein a grouping is performed and group-wise driving-in and driving-out of the heat-insulating carriages is enabled.

The heat-insulating installation described here preferably finds an application in rolling mills, particularly preferably in cogging trains and/or finishing trains in hot-rolling mills having a continuous rolling operation, and/or a semi-continuous operation, and/or a batch-rolling operation. However, the invention can also be used in other systems in as far as said systems relate to metal processing, in particular the processing of steel and non-ferrous metals.

Further advantages and features of the present invention can be derived from the following description of preferred exemplary embodiments. The features described therein can be implemented individually or in combination with one or a plurality of the features set forth above, in as far as the features are not mutually exclusive. The following description of the preferred exemplary embodiments herein is performed with reference to the appended drawings.

BRIEF DESCRIPTION OF THE FIGURES

FIG. 1A shows a three-dimensional illustration of the heat-insulating carriage; FIGS. 1B and 1C show sectional illustrations of the heat-insulating carriage in the laterally closed and open state.

DETAILED DESCRIPTION OF PREFERRED EXEMPLARY EMBODIMENTS

Preferred exemplary embodiments will be described hereunder by means of the figures. Identical, similar, or elements with equivalent functions herein are provided with identical reference signs, and repeated description of these elements is to some extent dispensed with so as to avoid any redundancies.

Figure 1A:
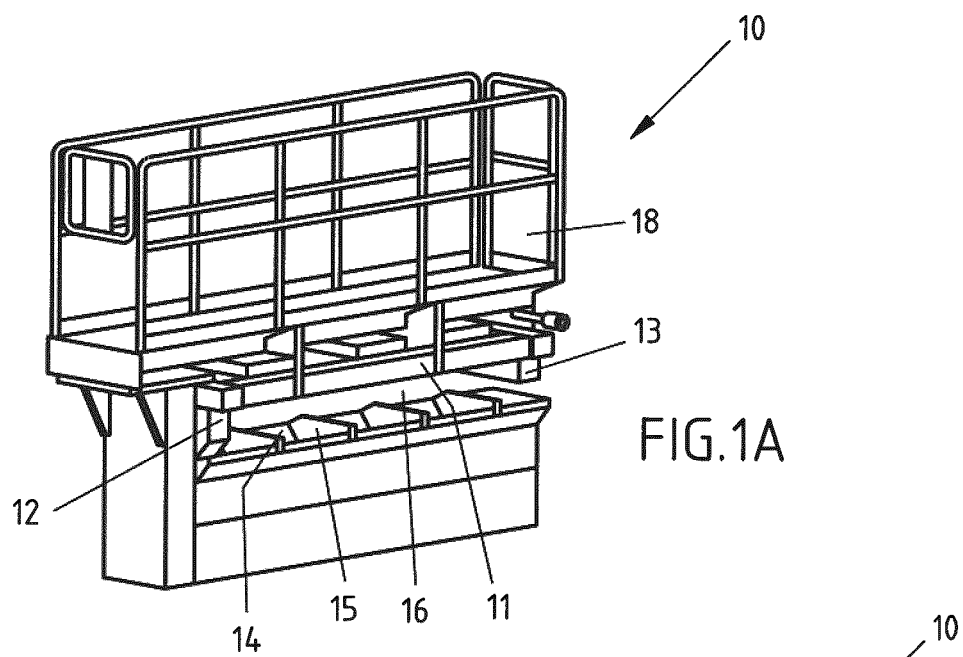
FIGS. 1A to 1C show a heat-insulating carriage for use in a rolling mill.

FIG. 1A shows a heat-insulating carriage 10 according to an exemplary embodiment. The heat-insulating carriage 10 has a heat-insulating hood 11 and two lateral heat insulations 12 and 13 which in each case have a heat-insulating structure. For example, said heat-insulating elements (and optionally further elements for the heat insulation) can be constructed from materials having a low thermal conductivity and/or a high reflective capability in terms of heat radiation. The heat insulation can however also be guaranteed or facilitated by vacuum heat insulation, geometrical or structural properties of the respective elements.

The heat-insulating hood 11 and the two lateral heat insulations 12 and 13, conjointly with an undercarriage 14 which can likewise be embodied so as to be heat-insulating, surround a heat-insulating space 16 through which the strip-shaped material to be insulated (not shown in FIGS. 1A to 1C and 2) passes, said strip-shaped material also being referred to as strip material or metal strip. To this end, opening slots through which the strip-shaped material passes into and out from the heat-insulating space 16 of the heat-insulating carriage 10, are provided. The heat-insulating space 16 together with the opening slots thus forms a tunnel for the strip-shaped material.

The undercarriage 14 in the embodiment illustrated has overpass ribs 15 which protrude into the heat-insulating space 16 and serve for transporting the material to be insulated in that said material bears on the overpass ribs 15. Alternatively or additionally, overpass rollers can be provided, or the undercarriage 14 can be constructed in another way as long as the material to be processed, for instance the rolled sheet metal or the sheet metal to be rolled, can pass through the heat-insulating space 16 of the heat-insulating carriage 10 without problems.

Figure 1B:
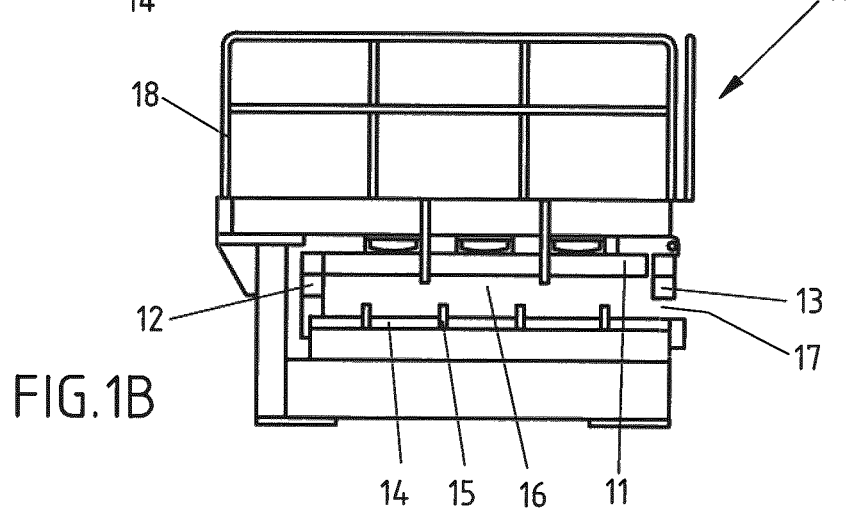
Figure 1C:
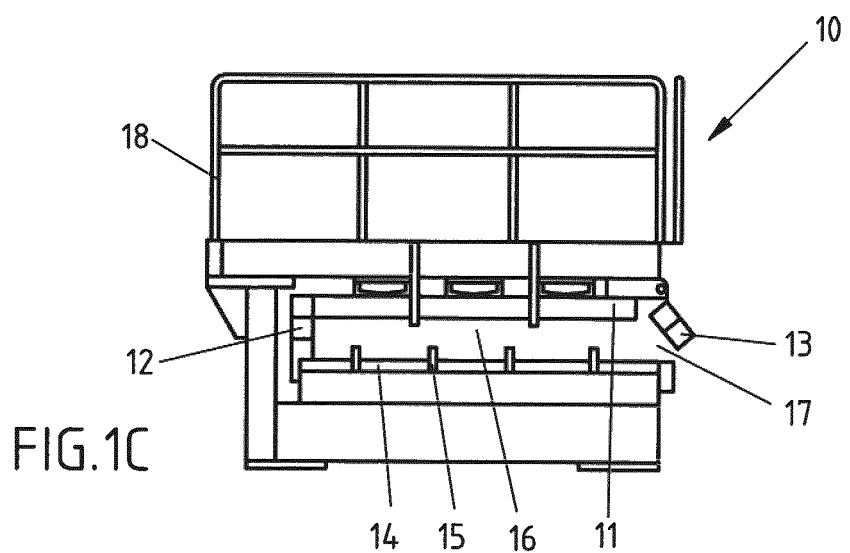

It can be particularly clearly derived from the sectional FIGS. 1B and 1C that the heat-insulating hood 11 and/or the lateral heat insulations 12 and 13 can be constructed in a modular manner, that is to say that a plurality of heat-insulating elements which can be adapted in a simple manner to different environments, materials, and/or operating conditions can be provided, for example.

The lateral heat insulation 13 is provided so as to be pivotable, such that the heat-insulating space 16 can be laterally opened and closed. This can be particularly readily derived from a comparison of FIGS. 1B and 1C, wherein FIG. 1B shows the closed state and FIG. 1C shows the opened state. This functionality can be utilized for opening the heat-insulating space 16 in the case of a disruption and/or for regulating the insulating performance. Alternatively or additionally, the lateral heat insulation 12 can of course be provided so as to be pivotable. In general terms, it can be useful for one or a plurality of heat-insulating sides to be provided so as to be adjustable (displaceable, pivotable, etc.), on account of which the heat-insulating carriage 10 can be set in a simple manner for different working conditions. The lateral heat insulation 13 in the present exemplary embodiment is provided such that this movably mounted module can be pulled over the strip-shaped material, for instance the rolled material, on account of which the heat-insulating carriage 10 can be laterally pulled out of the processing line. The heat-insulating carriage 10 can thus be driven in and driven out in the continuous rolling operation and/or the batch rolling operation, for example.

In the case of the exemplary embodiment shown here, a lateral slot 17 between the lateral heat insulation 13 and the undercarriage 14 is at all times provided additionally to the pivotability of the lateral heat insulation 13, so as to be able to drive the heat-insulating carriage 10 into and out of the processing line also during the processing process. An alternative construction form is the closed heat-insulating carriage 10 which cannot be driven in or driven out during the strip operation, or the rolling operation, respectively.

The heat-insulating carriage 10 illustrated in FIGS. 1A to 1C furthermore has an accessible platform 18 having safety railings, on account of which maintenance jobs, control jobs, and/or check jobs on the heat-insulating installation and/or the system can be carried out in a simple and safe manner.

Figure 2:
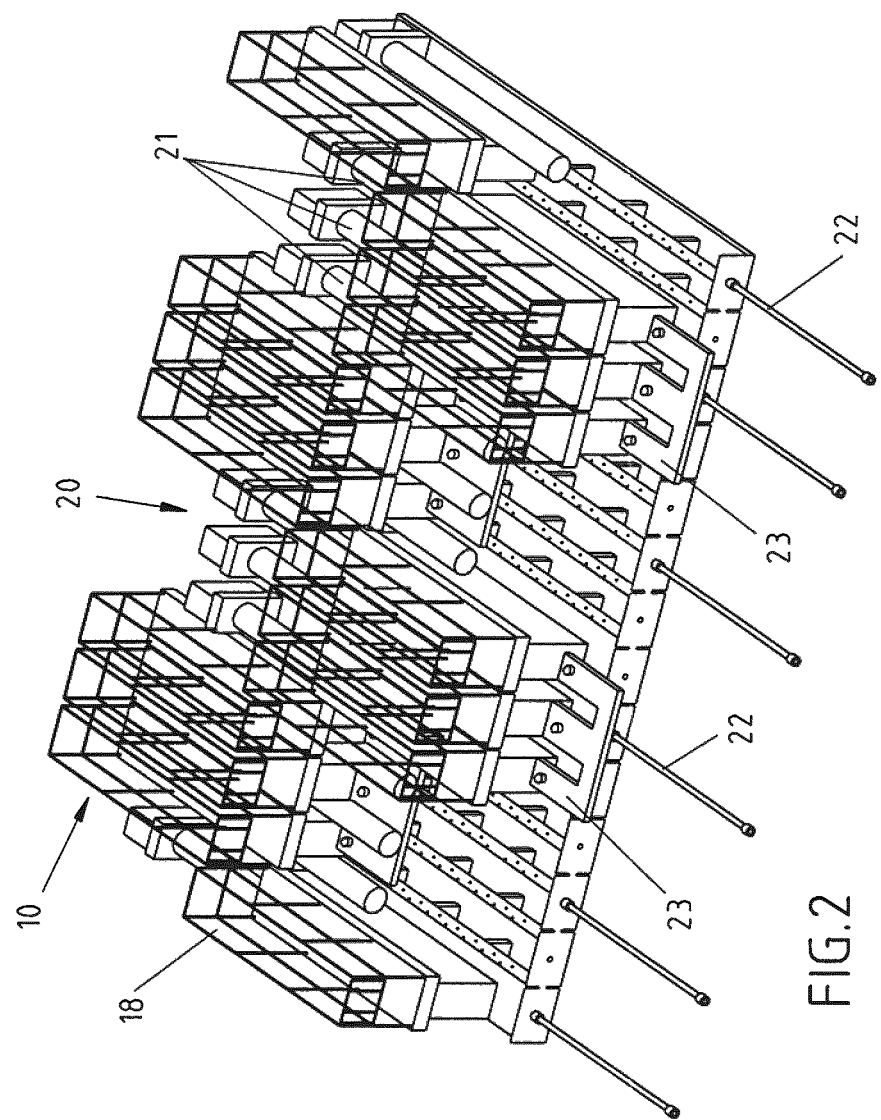
FIG. 2 shows an assembly of a plurality of heat-insulating carriages on a base frame along a processing line, illustrated as a three-dimensional view from obliquely above.
Figure 3:
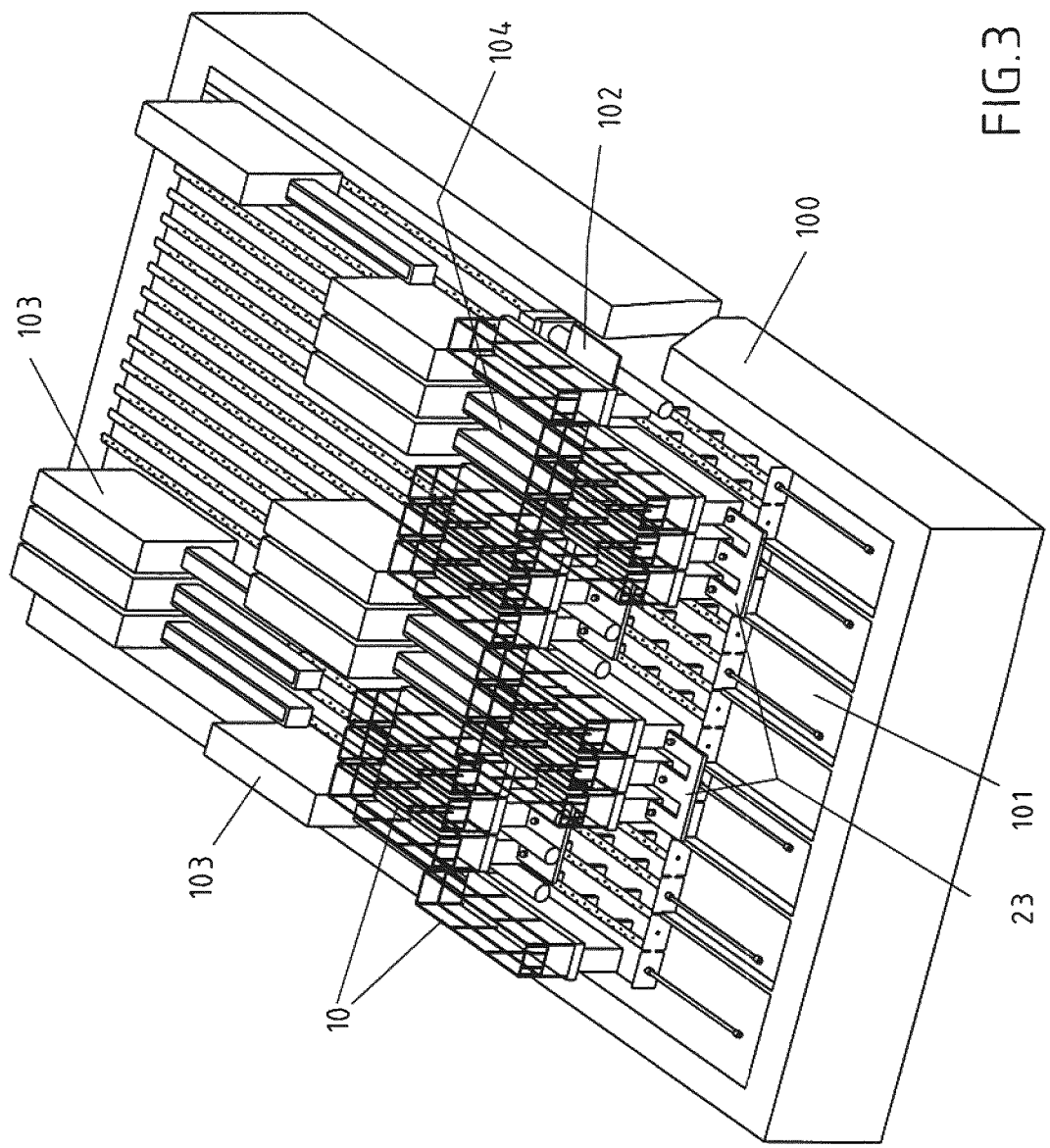
FIG. 3 shows an assembly of a plurality of heat-insulating carriages in combination with induction heater modules on a base frame along a processing line, illustrated as a three-dimensional view from obliquely above.

The embedding of a plurality of heat-insulating carriages 10 in a strip-processing system, in particular the modularity and relocation capability of said heat-insulating carriages 10, can be derived from FIGS. 2 and 3.

A roller way 20 having rollers 21 which are disposed behind one another such that said rollers 21 are suitable for transporting a strip material, for instance a continuous sheet metal, is shown in FIG. 2. To this end, the rollers 21 can at least in part be driven. The plurality of heat-insulating carriages 10 can be driven into the roller way 20, thus into the processing line, and then driven out of the latter; said heat-insulating carriages 10 in the driven-in state are in particular provided between the rollers 21. To this end, the heat-insulating carriages 10 can be mechanically relocated on rails or bars or by means of rollers. The relocating or the adjusting of the heat-insulating carriages 10 can be performed in a mechanical manner by way of relocation cylinders 22 which are situated on the operator side. Alternatively, the drive can be implemented so as to be electric, pneumatic, hydraulic, a combination thereof, or in any other manner as long as a reliable driving-in and driving-out of the heat-insulating carriages 10 is guaranteed. The driving-in is preferably performed from the operator side, but driving-in from the drive side, which relative to the processing line lies opposite the operator side, is also conceivable.

Two or more heat-insulating carriages 10 can be grouped in that said heat-insulating carriages 10 are connected to one another, for example by way of a connection element 23 for grouping. On account thereof, the heat-insulating carriages 10 can be relocated individually or in groups, depending on the requirement.

The drive for driving-in and driving-out of the heat-insulating carriages 10 is possible underground, as can be particularly clearly derived from FIG. 3. A foundation 100 in which underground drives 101 for the relocatable activation of the heat-insulating carriages 10 (and optionally further modules) are installed is shown in said FIG. 3. The strip material, that is to say the rolled material, for example, is partially shown in FIG. 3 and is identified by the reference sign 102. The rolling and/or transporting direction in the view of FIGS. 2 and 3 is from the left to the right.

It can furthermore be derived from FIG. 3 that the relocation capability of the heat-insulating carriages 10 supports the modular character of the system in a particular manner. This is because one or a plurality of other modules for the strip material 102 can be provided besides the heat-insulating carriages 10. In the example of FIG. 3, induction heaters 103 which can be driven into the processing line alternatively to the heat-insulating carriages 10, so as to actively heat the strip material 102, are provided. Alternatively, depending on the requirement, gaps 104 in the processing line can be left vacant at locations where neither insulating or heating is required, or for reasons of maintenance, fault repair, etc.

The installation space hi a rolling line or generally a strip-processing line can be effectively utilized by way of the heat-insulating carriages 10 illustrated here. A free space for maintenance jobs can furthermore be achieved by way of the relocation capability.

The heat-insulating carriages 10 and the modular embedding thereof are in particular suitable for the application in rolling mills, for instance in cogging trains and finishing trains in hot-rolling mills having a continuous rolling operation and/or a batch rolling operation. The heat-insulating carriages 10 serve for avoiding temperature losses and, in as far as required, can be equipped with an overpass function (here implemented in an exemplary manner by overpass ribs 15) for the rolled material. The heat-insulating carriages 10 can be coupled in a modular manner to other installations such as, for instance, induction heaters 103.

In as far as applicable, all individual features which are illustrated in the exemplary embodiments can be combined with one another and/or replaced with one another, without departing from the scope of the invention.

LIST OF REFERENCE SIGNS

10 Heat-insulating carriage
11 Heat-insulating hood
12 Lateral heat insulation (fixed)
13 Lateral heat insulation (movable for opening and closing)
14 Undercarriage
15 Overpass ribs
16 Heat-insulating space
17 Lateral protection
18 Platform
20 Roller way
21 Rollers
22 Relocation cylinder
23 Connection element for grouping
100 Foundation
101 Underground drive
102 Strip material/rolled material
103 Induction heater
104 Gap/intermediate space in the processing line

The invention claimed is:

1. A heat-insulating installation for use in a processing line for a metal strip to be transported along a strip-conveying direction, the heat-insulating installation comprising:
at least one heat-insulating carriage which has a heat-insulating hood that is fixed in a horizontal orientation and is movable in a horizontal direction over the metal strip for minimizing temperature losses; and
a transporting means which includes a drive for relocating the heat-insulating carriage and is configured so that the heat-insulating carriage is driveable horizontally out of and into the processing line, wherein the heat-insulating carriage has an undercarriage that lies opposite the heat-insulating hood so that the undercarriage is disposed below the metal strip when the driven-in heat-insulating carriage is moved over the metal strip.

2. The heat-insulating installation according to claim 1, wherein the heat-insulating carriage is driveable horizontally along a straight line.

3. The heat-insulating installation according to claim 1, wherein the transporting means includes at least one rail and/or bar and/or roller.

4. The heat-insulating installation according to claim 1, wherein the drive is hydraulic and/or electric and/or pneumatic and/or a combination thereof.

5. The heat-insulating installation according to claim 1, further comprising a roller way provided along the processing line and having a plurality of rollers for transporting the metal strip, wherein the heat-insulating carriage is movable into and out of an intermediate space between two neighboring rollers.

6. The heat-insulating installation according to claim 1, wherein the heat-insulating carriage has lateral heat insulations which, conjointly with the heat-insulating hood, configure a profile that is U-shaped in a cross section perpendicular to the strip-conveying direction.

7. The heat-insulating installation according to claim 1, wherein the undercarriage has overpass elements capable of being brought into contact with the metal strip in order for the metal strip to pass over in a driven-in state of the heat-insulating carriage.

8. The heat-insulating installation according to claim 7, wherein the overpass elements are ribs and/or rollers.

9. The heat-insulating installation according to claim 6, wherein the heat-insulating hood, the lateral heat insulations, and the undercarriage configure walls of a tunnel that surrounds a heat-insulating space and through which the metal strip passes in a driven-in state of the heat-insulating carriage.

10. The heat-insulating installation according to claim 9, wherein the tunnel has a lateral slot, and/or at least one portion of the tunnel walls is provided such that said portion is openable and closeable.

11. The heat-insulating installation according to claim 6, wherein at least one of the lateral heat insulations is mounted so as to be pivotable.

12. The heat-insulating installation according to claim 1, wherein the heat-insulating carriage has a platform.

13. A system for processing a metal strip, comprising: a roll table having rollers for transporting the metal strip along a strip-conveying direction; and at least one heat-insulating installation according to claim 1, the heat-insulating carriage of said heat-insulating installation being capable of being driven into and out of an intermediate space between neighboring rollers of the roll table.

14. The system according to claim 13, further comprising at least one induction heater capable of being driven into and out of an intermediate space that is not occupied by the heat-insulating carriage.

15. The system according to claim 13, wherein the heat-insulating installation includes a plurality of heat-insulating carriages, further comprising a connecting element that connects the plurality of heat-insulating carriages to one another to form a grouping so that group-wise driving-in and driving-out of the heat-insulating carriages is enabled.

\* \* \* \* \*